March 12, 1929.  E. A. JOHNSTON  1,705,294
LAND PACKER
Filed June 2, 1927
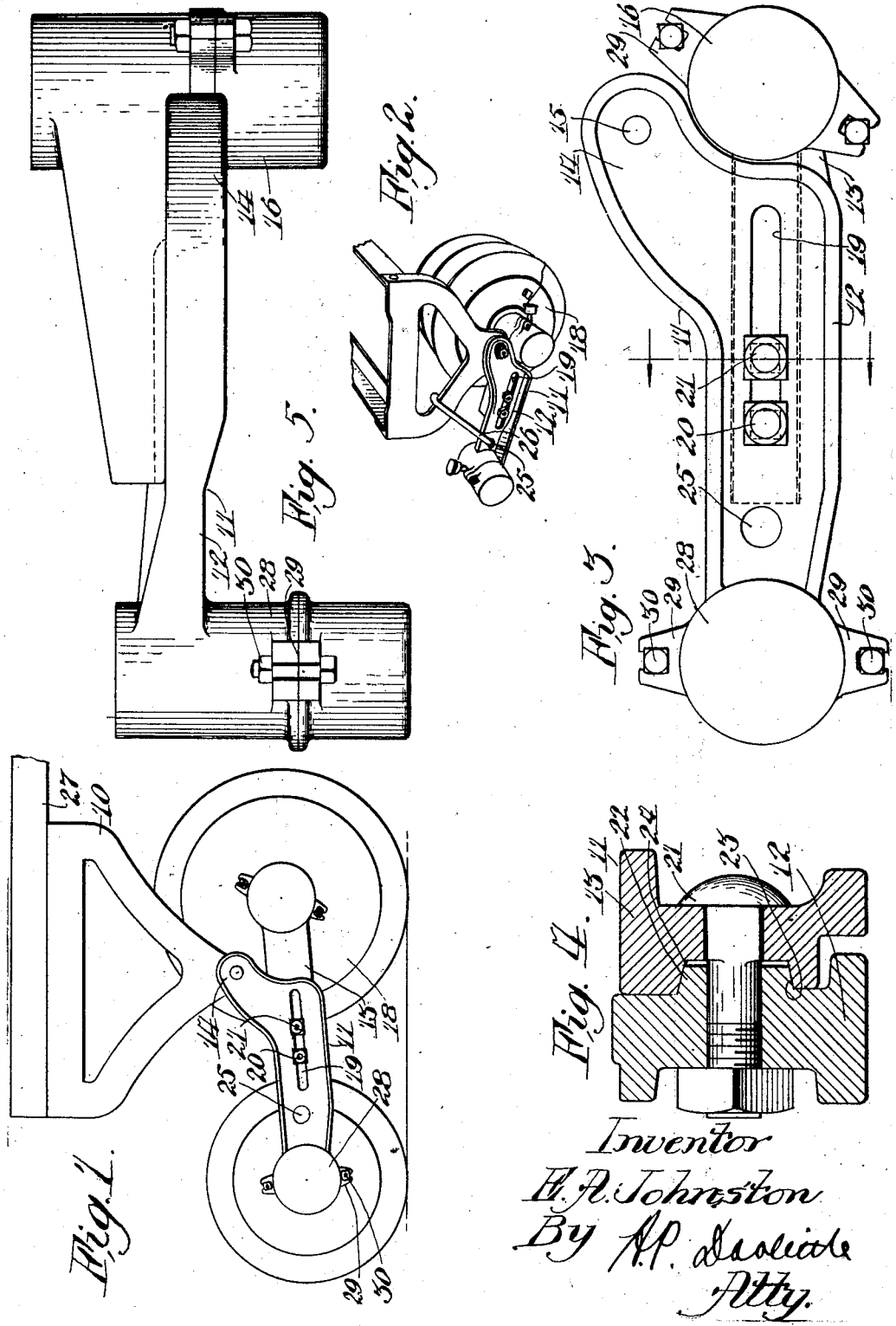

Patented Mar. 12, 1929.

1,705,294

UNITED STATES PATENT OFFICE.

EDWARD A. JOHNSTON, OF CHICAGO, ILLINOIS, ASSIGNOR TO INTERNATIONAL HARVESTER COMPANY, A CORPORATION OF NEW JERSEY.

LAND PACKER.

Application filed June 2, 1927. Serial No. 195,909.

This invention relates to improvements in a tillage implement known as a sub-soil packer, and is more particularly concerned with such a machine in which two ranks of earth working disks or rollers are employed, a forward rank and a rearward rank.

It is an object of the invention to provide an extensible supplemental frame connecting two ranks of earth working elements.

It is a further object of the invention to provide a packer with an extensible supplemental frame which will permit of the desired distribution of weight upon the implements for advantageous operation.

Another object of the invention is to provide a packer with an extensible disk frame which permits the securement of one of the ranks of disks in elevated or inoperative position without imposition of a substantial upward thrust upon the tongue of the implement.

Other objects of the invention will appear as the following description proceeds.

In the accompanying drawings:

Figure 1 is an end elevation of the illustrative embodiment of the invention;

Figure 2 is a perspective view of a packer, showing the position of the parts when the rear rank is secured in elevated position;

Figure 3 is an enlarged detail end elevation of the extensible disk frame;

Figure 4 is an enlarged transverse sectional view taken on the section line 4—4 of Figure 3; and Figure 5 is an enlarged plan of the extensible disk frame.

In the drawings, there is shown the main frame 10 the end members of which are of substantially triangular formation. At the downwardly presented apex of an end member, the extensible disk frame indicated generally by the numeral 11 is employed. This disk frame is in the main comprised of a pivoted member 12 and a slidable member 13 which may be moved along the member 12 to any desired position of adjustment.

The member 12 is preferably provided with an upward extension 14 pivoted to the main frame on an axis indicated at 15. This extension is preferably formed at its forward side along a curve so as to permit of the positioning of the forward journal box 16 substantially underneath the mid-portion of the main frame.

For the purpose of properly distributing the weight upon the two ranks of disks indicated at 17 and 18 to meet different soil conditions, the member 12 is provided with a slot indicated at 19. Bolts 20 and 21 project through the slidable member 13 and are positioned within the slot 19. Obviously when the bolts 20 and 21 are loosened, the slidable member 13 and the forward journal box 16 may be so moved that the rank 18 is moved relative to the main frame 10 and the rank 17 so as to increase or decrease the distance between the two ranks of disks. When the rank 18 is moved to the desired position, it is held therein by the tightening of the nuts upon the bolts 20 and 21.

Inasmuch as the two ranks of disks 17 and 18 must be held rigidly in any desired relationship, and inasmuch as considerable weight is sometimes placed upon the main frame 10, it is important that a rigid and substantial structure be provided for securely maintaining the ranks of disks in any positions to which they are adjusted. Such an arrangement of elements is illustrated in Figure 4 of the drawings. In this view the member 12 is provided with a wide rib 22 with beveled sides 23. This rib co-operates with a similarly formed groove 24 in the slidable member 13. This arrangement of elements insures that the members 12 and 13 are always in the desired alinement and that the two ranks of disks are held rigidly in any position to which they are adjusted. The wide rib structure 22 on the member 12 also reenforces the portion of that member which would be otherwise weakened by the formation of the slot 19 therein.

When it is desired to operate the illustrative machine with only one rank of disks in use, one rank is secured in elevated position, as indicated in Figure 2. As herein shown the member 12 is provided with an opening 25 through which a hooked lifting member 26 is inserted. The upper end of the member 26 is hooked over one portion of the main frame, as clearly illustrated in Figure 2. When the machine is so used, any tendency to unduly tilt the tongue 27 and the main frame 10 may be corrected by adjusting the slidable member 13 relative to the member 12.

In the illustrative embodiment, the rear journal box 28 as well as the forward journal box 16 are shown as being composed of two parts, the outer parts being provided with slotted ears 29 through which bolts 30 may be passed to secure the outer parts to the complementary parts of the journal boxes.

While the invention has been illustrated and described with reference to one particular machine, it is to be understood that the invention is not necessarily limited thereto, but that it is of a scope commensurate with the breadth of the subjoined claims.

What is claimed as new is:

1. A packer comprising, in combination, a forward rank of disks, a rearward rank of disks, a rigid extensible disk frame connecting said ranks of disks, and a main frame pivoted to the extensible disk frame.

2. A packer comprising, in combination, a forward rank of disks, a rearward rank of disks, a main frame, a member pivoted at each end of the main frame and secured to one of said ranks of disks, and a second member mounted for sliding adjustment upon each of the above mentioned members in fixed relation thereto and secured to the other rank of disks.

3. A packer comprising, in combination, a main frame, a forward rank of disks, a rearward rank of disks, and a rigid extensible disk frame pivoted at each end of the main frame and movably mounting the ranks of disks upon the main frame, said disk frames being extensible in one direction for varying the distances between the axes of said ranks of disks.

4. A packer comprising, in combination, a forward rank of disks, a rearward rank of disks, a rigid sectional disk frame operatively connecting said ranks of disks and being extensible to shift the forward disks, and a main frame pivoted to the part of the extensible disk frame which extends to the rearward disks.

5. A packer comprising, in combination, a forward rank of disks, a rearward rank of disks, a main frame, a member pivoted at each end of the main frame and secured to the rearward rank of disks, and a second member mounted for sliding adjustment upon each pivoted member and secured to the forward rank of disks, the pivotal connections with the main frame being located over said second members so that the axis of the forward disks may be located substantially directly underneath the axis of the pivotal connections.

6. A packer comprising, in combination, a main frame, a forward rank of disks, a rearward rank of disks, and a disk frame pivoted at each end of the main frame and movably mounting the ranks of disks upon the main frame, said disk frames being extensible in one direction for varying the distances between the axes of said ranks of disks, each disk frame comprising a pivoted member, an additional member slidably adjustable thereon, each pivoted member having a lateral extension through which and an adjacent part of the main frame a pivot pin extends.

7. An earth working implement comprising the combination of a main frame, a sectional supplemental frame carrying parallel ranks of earth working elements mounted on transverse shafts carried by respective sections of the supplemental frame, a rocking connection between the main and supplemental frames, and adjustable rigid connections between the sections of said supplemental frame.

8. An earth working implement comprising the combination of a main frame, a supplemental frame comprising rear members pivotally connected at the forward ends thereof to the main frame and forward members slidable on the rear members and extending forwardly from said rear members, means for securing the front and rear members together in adjusted position, and roller carrying shafts mounted in the free ends of the front and rear members respectively.

9. An earth working implement comprising the combination of a main frame, a supplemental frame comprising rear members formed with horizontally extending portions having upwardly and forwardly directed forward ends and forward members slidable in a fore and aft direction on the horizontal portions of the rear members below the forward ends thereof, pivotal connections between said forward ends of the rear members and the main frame, means for adjusting and securing the forward members on the rear members, and roller carrying shafts mounted in the free ends of the front and rear members respectively.

In testimony whereof I affix my signature.

EDWARD A. JOHNSTON.